United States Patent
He

(10) Patent No.: US 11,300,186 B2
(45) Date of Patent: Apr. 12, 2022

(54) LAUNCH DEVICE DAMPER

(71) Applicant: EXEDY GLOBALPARTS CORPORATION, Belleville, MI (US)

(72) Inventor: Hanjun He, Canton, MI (US)

(73) Assignee: Exedy GlobalParts Corporation, Belleville, MI (US)

( * ) Notice: Subject to any disclaimer, the term of this patent is extended or adjusted under 35 U.S.C. 154(b) by 0 days.

(21) Appl. No.: 16/965,910

(22) PCT Filed: Jan. 29, 2019

(86) PCT No.: PCT/US2019/015681
§ 371 (c)(1),
(2) Date: Jul. 29, 2020

(87) PCT Pub. No.: WO2019/148191
PCT Pub. Date: Aug. 1, 2019

(65) Prior Publication Data
US 2021/0033180 A1    Feb. 4, 2021

Related U.S. Application Data

(60) Provisional application No. 62/623,264, filed on Jan. 29, 2018.

(51) Int. Cl.
*F16H 45/02* (2006.01)
*F16F 15/123* (2006.01)

(52) U.S. Cl.
CPC ....... *F16H 45/02* (2013.01); *F16F 15/12366* (2013.01); *F16H 2045/0221* (2013.01);
(Continued)

(58) Field of Classification Search
CPC ............. F16H 45/02; F16H 2045/0221; F16H 2045/0278; F16H 2045/0284; F16H 2045/021; F16F 15/12366
See application file for complete search history.

(56) References Cited

U.S. PATENT DOCUMENTS 4,785,924 A * 11/1988 Jackel .................. F16F 15/129
                                                  192/214.1
5,407,041 A *  4/1995 Fukunaga ............... F16H 45/02
                                                  192/3.29
(Continued)

FOREIGN PATENT DOCUMENTS

DE        10061925       *  7/2002
JP      2005-155821      *  6/2005
(Continued)

OTHER PUBLICATIONS

Machine language translation of DE10061925.*
Machine Language translation of JP2005-155821.*

*Primary Examiner* — Mark A Manley
(74) *Attorney, Agent, or Firm* — Eric J. Sosenko; Jonathan P. O'Brien; Honigman LLP

(57) ABSTRACT

A launch device for coupling a rotary output of a prime mover to a rotary input of a transmission. The launch device includes a front cover connected to the rotary output member of the prime mover and an output hub connected to the rotary input of the transmission. A rear cover cooperates with the front cover to define a chamber in which an impeller and a turbine are located. A damper is coupled between the turbine and the output hub and a lock-out clutch is coupled to the damper to releasably lock the damper for rotation with one of the front and rear covers. Connecting the clutch assembly to the damper is a clutch plate in which a clutch drum of the clutch assembly is unitarily formed with the input members of the damper.

20 Claims, 3 Drawing Sheets

(52) U.S. Cl.
CPC ............... *F16H 2045/0278* (2013.01); *F16H 2045/0284* (2013.01)

(56) References Cited

U.S. PATENT DOCUMENTS

| | | | |
|---|---|---|---|
| 5,964,328 A * | 10/1999 | Fallu | F16H 45/02 |
| | | | 192/212 |
| 2011/0120829 A1 | 5/2011 | Vanni et al. | |
| 2013/0175131 A1* | 7/2013 | Iwashita | F16D 33/18 |
| | | | 192/3.29 |

FOREIGN PATENT DOCUMENTS

| | | |
|---|---|---|
| JP | 2017020583 A | 1/2017 |
| WO | 20110060891 A1 | 5/2011 |
| WO | 20120042718 A1 | 4/2012 |

* cited by examiner

LAUNCH DEVICE DAMPER

CROSS REFERENCE TO RELATED APPLICATIONS

This application is a national stage entry of international application no. PCT/US2019/015681, filed Jan. 29, 2019, which claims the benefit U.S. provisional application No. 62/623,264 filed Jan. 29, 2018. This entire contents of the above-referenced applications are expressly incorporated herein by reference.

BACKGROUND

1. Field of the Invention

The present invention generally relates to launch devices, such as torque converters, used in connection with the automatic transmission of an automotive vehicle. More specifically, the invention relates to a tuned spring mass damper, also known as a dynamic damper, of such a launch device.

2. Description of Related Technology

Generally, vehicles with automatic transmissions utilize a torque converter to couple the output of the engine with the automatic transmission. A representative torque converter is seen in FIG. 1.

As seen therein, the torque converter includes a front cover that is connected to and rotates with the flex plate (not shown) of the engine. The front cover is connected to a back cover, which is integral with and causes rotation of an impeller. The impeller includes a series of blades or vanes that extend inward in the chamber defined by the front and rear covers. During rotation of the impeller, hydraulic fluid within the chamber is forced radially outward, under centrifugal forces, then forward (to the left in FIG. 1), by the shape of the impeller and blades, where the fluid impacts against the blades of a turbine. The radially outward portions of the turbine blades are opposed to the radially outward portions of the impeller blades so that the turbine blades receive the hydraulic fluid from the impeller blades.

The force of the hydraulic fluid and the shape of the turbine blades induce rotation of the turbine and redirects the hydraulic fluid radially inward (downward in FIG. 1) and, subsequently, back towards the impeller. The turbine is further mounted to a hub, which is in turn mounted to an input shaft of the automatic transmission. Thus, rotation of the turbine and hub causes rotation of the input shaft and the automatic transmission.

To enable torque multiplication, located between the lower portions of turbine and impeller blades is a stator mounted on a one-way clutch. The stator redirects fluid from the turbine so that it is received by the impeller without impeding rotation of the impeller, thereby resulting in the torque multiplication. As seen from the above description, the impeller, turbine and stator define a hydrodynamic coupling or circuit in the torque converter.

Forward of the turbine, between the turbine and the front cover, the torque converter also includes a clutch assembly and a dynamic damper, the latter of which is sometimes referred to as a dynamic absorber. As seen in FIG. 1, the clutch assembly is arranged on the forward or the engine side of the torque converter and, when engaged, locks rotation of the turbine with rotation of the front cover and the output of the engine. While locked-up, as well as during engagement and disengagement of the clutch assembly, oscillations (fluctuations and variations) of the engine's rotational speed can be transferred through the torque converter. This vibration and resulting noise (NV) can often be felt and heard by the operator of the automobile. The dynamic damper/absorber is provided in the launch device to limit the NV experienced by the operator.

A conventional damper has a clutch drum that transfers torque to a drive plate. The drive plate receives torque from the clutch drum and outputs the torque to the damper springs. The springs in turn transfer the torque to a hub flange. The hub flange is torsionally moveable relative to the drive plate via a slot located in the hub flange and a stop pin inserted through the slot, which also extends through a support plate supporting the springs. The slot in the hub flange weakens the hub flange and results in smaller springs and small angular rotations between the hub flange and drive plate, which in turn means a high damper rate. Due to the gap between the stop pin and the slot of the hub flange, the clutch plate can move in a radial direction, which may negatively affect operation of the clutch. Additionally, relative movement between the springs and the drive plate can cause large hysteresis torque, and the support plate is required to react with axially with piston operating on the clutch and the resulting movement of the drive plate. Thus, the space and packaging limitations of the conventional damper constructions, as provided above, requires large spring rates and hysteresis.

SUMMARY

In overcoming various drawbacks and other limitations of the known art, the present invention provides a launch device for coupling a rotary output of a prime mover to a rotary input of a transmission, the launch device including a front cover configured to connect to the rotary output member of the prime mover, an output hub defining a central axis and configured to connect to the rotary input of the transmission, a rear cover connected to the front cover and rotatable therewith, the front cover and the rear cover cooperating to define a chamber, an impeller having a plurality of impeller blades extending in the chamber, a turbine located within the chamber and including a plurality of turbine blades generally opposing the impeller blades such that hydraulic fluid is directed from the impeller blades and toward the turbine blades, a damper coupled between the turbine and the output hub of the launch device, a lock-out clutch coupled to the damper and configured to releasably lock the main damper for rotation with one of the front and rear covers, the launch device characterized by the clutch assembly being connected to the damper by a clutch plate integrating a clutch drum of the clutch assembly and input members of the damper.

In another aspect of the invention, a launch device for coupling a rotary output of a prime mover to a rotary input of a transmission, the launch device including a front cover configured to connect to the rotary output member of the prime mover, an output hub defining a central axis and configured to connect to the rotary input of the transmission, a rear cover connected to the front cover and rotatable therewith, the front cover and the rear cover cooperating to define a chamber, an impeller having a plurality of impeller blades extending in the chamber, a turbine located within the chamber and including a plurality of turbine blades generally opposing the impeller blades such that hydraulic fluid is directed from the impeller blades and toward the turbine blades, a damper coupled between the turbine and the output hub of the launch device, a lock-out clutch coupled to the damper and configured to releasably lock the damper for rotation with one of the front and rear covers; and a clutch plate connecting the clutch assembly to the damper, the clutch plate including a clutch drum of the clutch assembly unitarily formed with the input members of the damper.

In a further aspect, the clutch plate is unitary and incorporates portions defining the clutch drum at one end and portions defining the input members at another end.

In yet another aspect, the clutch plate is continuous between the clutch drum and the input members.

In still a further aspect, the clutch plate is radially continuous between the clutch drum and the input members.

In an additional aspect, the clutch drum and input members are axial extensions and are connected by a radially extending portion of the clutch plate.

In another aspect, the radially extending portion of the clutch plates includes circumferentially extending slots.

In a further aspect, each of the slots is located between adjacent ones of the input members.

In yet another aspect, the clutch plate is moveably mounted to a hub flange of the damper by stop pins extending through the slots, the hub flange including portions defining the output hub.

In still a further aspect, the clutch plate is positioned between a ring plate and the hub flange, the stop pins engaging the ring plate.

In an additional aspect, the clutch plate includes less than four input members.

In yet another aspect, the damper includes less than four circumferentially extending springs.

In a further aspect, a plurality of friction plates extending radially inward from the clutch drum.

In an additional aspect, the clutch drum is located radially inward of the input member.

Further objects, features and advantages of this invention will become readily apparent to persons skilled in the art after review of the following description with reference to the drawings and the claims that are appended to and form a part of this specification.

DETAILED DESCRIPTION

Figure 1:
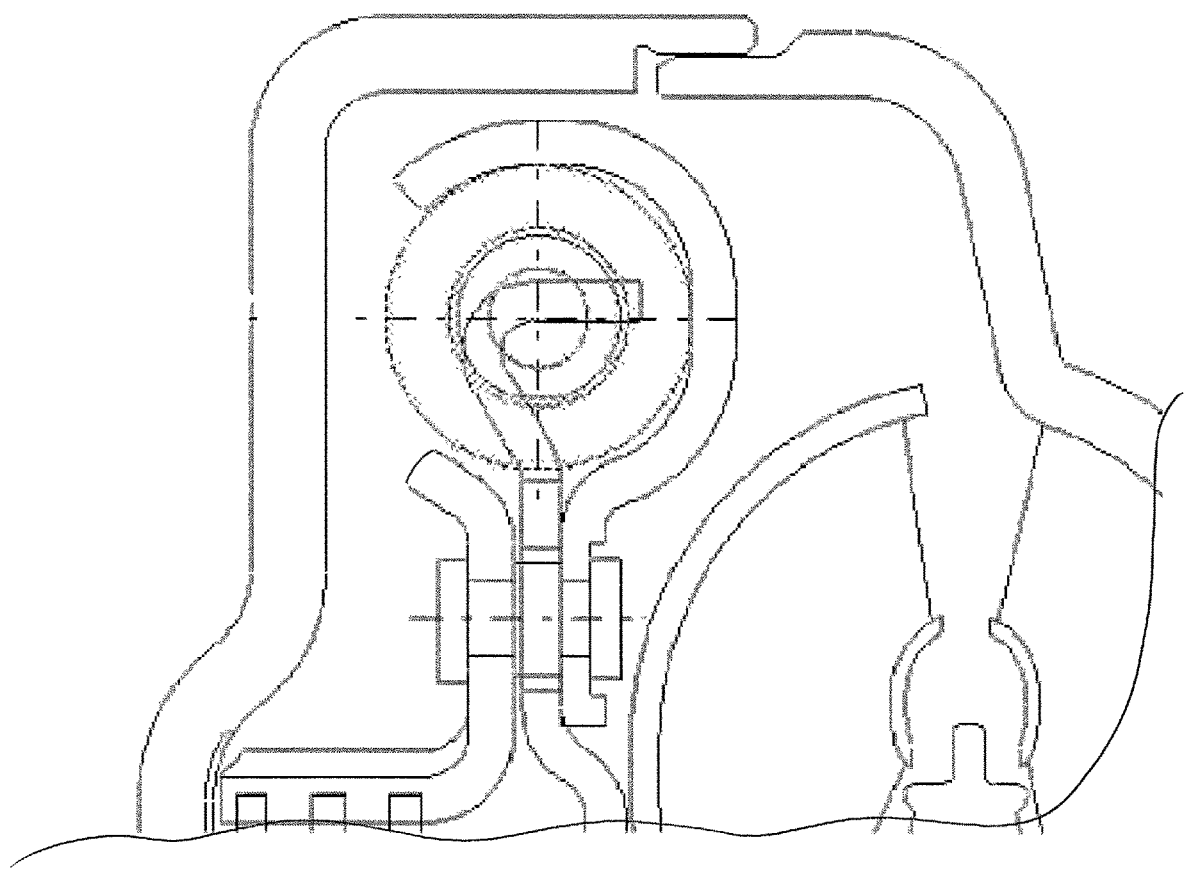
FIG. 1 is a fragmentary view, in axial cross-section, of a torque converter in accordance with a known construction of such devices, and which is discussed above.
Figure 2:
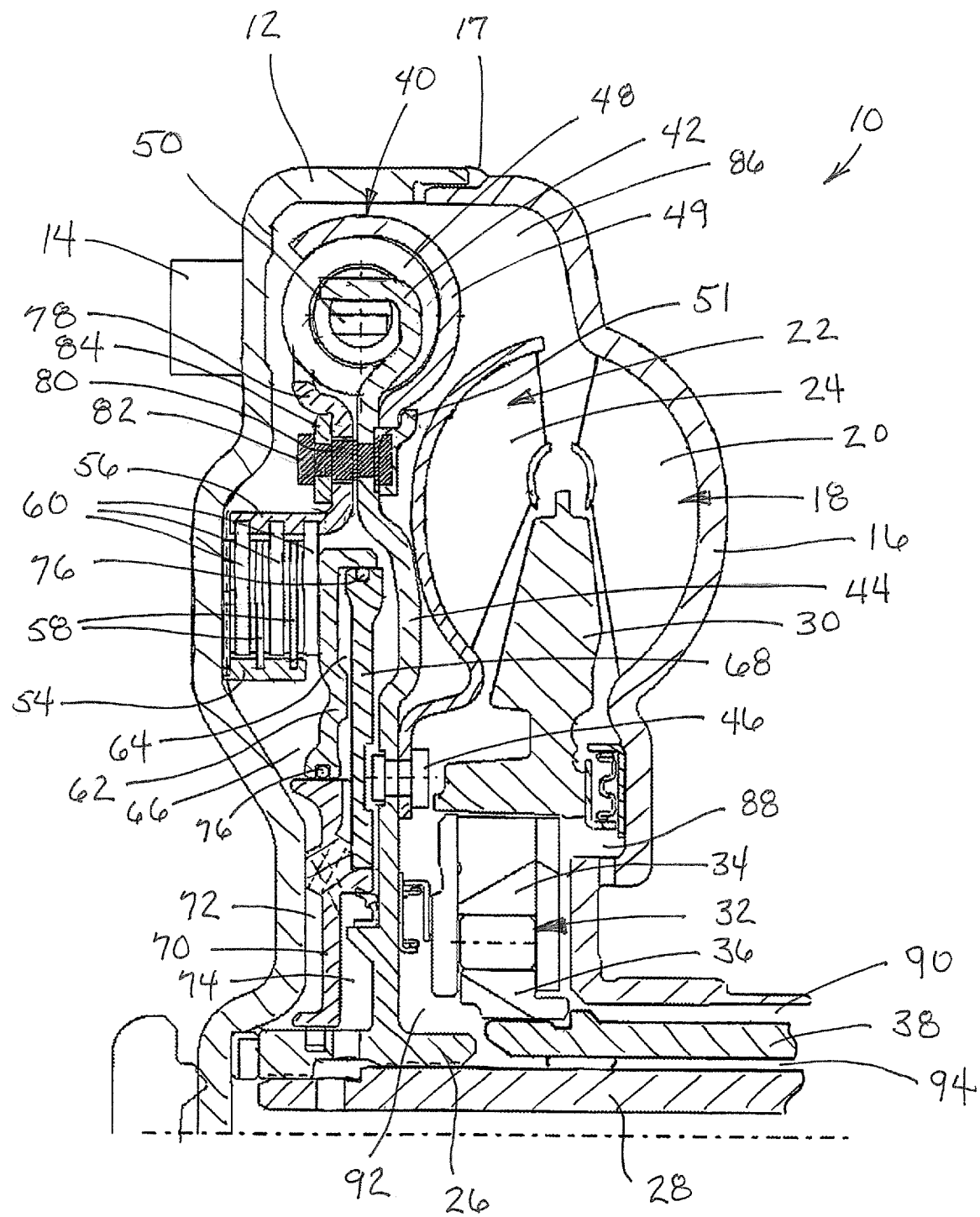
FIG. 2 is a fragmentary half view, in axial cross-section, of a launch device embodying the principles of the present invention.

Referring now to the drawings, a launch device embodying the principles of the present invention is generally illustrated in FIG. 2 and will be described with reference thereto. The description that follows may use directional terms such as "upper" and "lower." These terms are intended to be read in the context of the orientation of the elements as presented in the drawings. Accordingly, "upper" indicates a direction toward the top of the drawing and "lower" indicates a direction toward the bottom of the drawing. The terms "left" and "right" are similarly interpreted. The terms "inward" or "inner" and "outward" or "outer" indicate a direction that is generally toward or away from a central axis of the referred to part, whether or not such an axis is designated in the drawing. An axial surface is therefore one that faces in the axial direction. In other words, an axial surface faces in a direction along the central axis. A radial surface therefore faces radially, generally away from or toward the central axis. It will be understood, however, that these relative terms are for convenience of description that are not intended to require a particular orientation. In actual implementation, the directional references used herein may not necessarily correspond with the installation and orientation of the corresponding components of the device.

Terms concerning attachments, coupling and the like, such as "connected," "joined," "mounted" or "interconnected" refer to a relationship where the structures are secured or attached to one another either directly or indirectly through an intervening structure. These attachments and relationships may be movable or rigid, unless expressly described otherwise. "Integral" means that elements are connected together so as to form one unit. "Unitary" means a single, one piece element where all parts of the element are formed together. Thus, the term "unitary" is to be distinguished from the term "integral."

Referring now to FIG. 2, a launch device embodying the principles of the present invention is generally illustrated therein and designated at 10. The launch device 10 includes a front cover 12 having mounting features 14, such as threaded studs, spaced about its periphery and configured to connect the launch device 10 to a flex plate or outlet of a prime mover (not shown), such as a motor, including without limitation internal combustion engines, electric motors, other motive power source or combinations thereof. Also at its radial periphery, the front cover 12 is secured to a rear cover 16 by welding 17 or other suitable means to form a fluid tight chamber. The front cover 12 defines the engine side of the launch device 10, while the rear cover 16 defines the transmission side of the launch device 10. As the flex plate is rotated by the crankshaft (not shown) of the prime mover, the front and rear covers 12, 16 are rotated in therewith.

Internally, the rear cover 16 is provided with a series of blades or vanes 20 so as to form an impeller 18. During rotation of the rear cover 16, hydraulic fluid is supplied from the automatic transmission along a first pathway and is forced radially outwardly under the centrifugal force of the rotating blades 20 of the impeller 18. The blades 20 and the inner surface of the rear cover 16 also directs the hydraulic fluid forward, in a direction away from the rear cover 16. In FIG. 2, outward motion of the fluid is toward the top of the figure and forward motion of fluid is toward the left of the figure.

Immediately forward of the impeller 18, the launch device 10 includes a turbine 22 also formed with a series of blades 24. The turbine 22 is mounted to an output hub 26, and the hub 26 is connected to a rotatable input shaft 28 of the transmission of the automotive vehicle. As seen in FIG. 2, the inner diameter of the output hub 26 is configured to form a splined connection.

The blades 24 of the turbine 22 are oriented to receive the hydraulic fluid from the impeller 18. The force of the hydraulic fluid from the impeller 18 and the shape of the turbine's blades 24 drive the turbine 22 in a rotational direction that is the same as the rotational direction of the impeller 18. Hydraulic fluid received by the turbine 22 is in turn directed downward and redirected rearward, back toward the impeller 18.

Positioned between the radially inner portions of the blades 24 of the turbine 22 and the blades 20 of the impeller 18 is a stator 30. The stator 30 receives the hydraulic fluid being returned from the turbine 22 to the impeller 18. The stator 30 redirects the fluid so that it is in the same rotational direction as the impeller 18. This redirection is conducted in such a manner that it is efficiently received by the impeller 18 and does not impede rotation of the impeller 18, allowing for a multiplication of the torque passing through the launch device. With this fluid coupling, rotation from the output of the engine is transferred as rotation of the input shaft 28 of the automatic transmission.

Integrated with the stator 30 is a one-way clutch assembly 32 that limits rotation of the stator 30 to a single direction. The one-way clutch assembly 32 includes an outer race 34, upon which the stator 30 is supported, and an inner race 36. The inner race 36 of the one-way clutch assembly 32 is mounted upon a fixed, nonrotating support shaft 38 associated with the input of the automatic transmission. In the interest of brevity and since one-way clutch assemblies are well known in the technological field of the present invention, those skilled in the art will really appreciate the construction and operation of the one-way clutch assembly 32 and, as such, the assembly 32 is not explained in greater detail herein.

Forward of the turbine 22, between the turbine 22 and the front cover 12, the launch device 10 includes a damper 40. The damper 40 is supported by the output hub 26 that is in turn mounted on the input shaft 28 of the transmission. The damper 40 absorbs variations in the rotation speed of the front and rear covers 12, 18 to provide for smoother operation of the automatic transmission and for the transmission of less vibration to the occupant of the vehicle.

The damper 40 includes an output member 42 formed as part of a hub flange 44, which includes the output hub 26. As seen in FIG. 2, the turbine 22 is connected or fastened to the hub flange 44 by rivets 46 or another fastening mechanism.

Springs 48 of the damper 40 are arranged circumferentially between the output member 42 and an input member 50. Support for the springs 48 is provided by a floating support plate 49. The floating support plate 49 wraps around a majority of the spring's circumference and is configured to move with springs 48 during torsional movement between a clutch plate 78 and the hub flange 44, as further discussed below. Axial movement of the support plate 49 is restricted by a retaining plate 51 and the hub flange 44, which are secured to one another. Accordingly, torsional movement that is inputted by the input member 50 is transmitted to the springs 48, which circumferentially transmit the torsional movement to the output member 42 and output hub 26, which in turn transmits the torsional movement, i.e. rotation, to the input shaft 28 of the transmission.

Provided between the damper 40 and the front cover 12 is a lockup clutch assembly 52. When engaged, the lockup clutch assembly 52 locks the rotation the front cover, and therefore the output of the engine, with the turbine 22 and the output hub 26, and therefore the input shaft 28 of the transmission. The lockup clutch assembly 52 includes a clutch hub 54, a clutch drum 56, inner friction plates 58 and outer friction plates 60. The clutch hub 54 is fixed, by welding or other means, to the front cover 12 and supports the inner friction plates 58, which are mounted to the clutch hub 54 in a splined engagement. The outer friction plates 60 are interleaved with the inner friction plates 58 and are supported by the clutch drum 56. Similar to the inner friction plates 58, the outer friction plates 60 are mounted to the clutch drum 56 in a splined engagement.

Engagement of the clutch assembly 52 is controlled by a clutch piston 62 and a first or "ON" pressure chamber 64 and a second or "OFF" pressure chamber 66. The ON pressure chamber 64 is defined between the clutch piston 62 and a reaction plate 68 that is stationarily supported by a flange member 70 mounted on the output hub 26. The OFF pressure chamber 68 is defined between the clutch piston 62 and the front cover 12. When engaging pressure, preferably via hydraulic fluid, is provided to the ON pressure chamber 64 through a first fluid path 72, the clutch piston 62 is moved toward the front cover 12 engaging the inner friction plates 58 with the outer friction plates 60. When disengaging pressure, also preferably via hydraulic fluid, is provided to the OFF pressure chamber 66 through a second fluid path 74, the clutch piston 62 is moved away from the front cover 12, toward the reaction plate 68, disengaging the inner friction plates 58 from the outer friction plates 60. When engaging pressure is applied, the disengaging pressure is not applied and vice versa. Also, fluid seals 76, such as O-rings, are provided between the clutch piston 62 and the reaction plate 68 to fluidly seal the ON pressure chamber 64. The fluid seals 76 maintain the fluidic integrity of the ON pressure chamber 64 while permitting the clutch piston 62 to move relative to the reaction plate 68.

Rotational torque is transferred from the clutch assembly 52 to the damper 40 by a clutch plate 78, which is unitarily formed and includes the clutch drum 56 on one end and the input member 50 on the other end.

Figure 3:
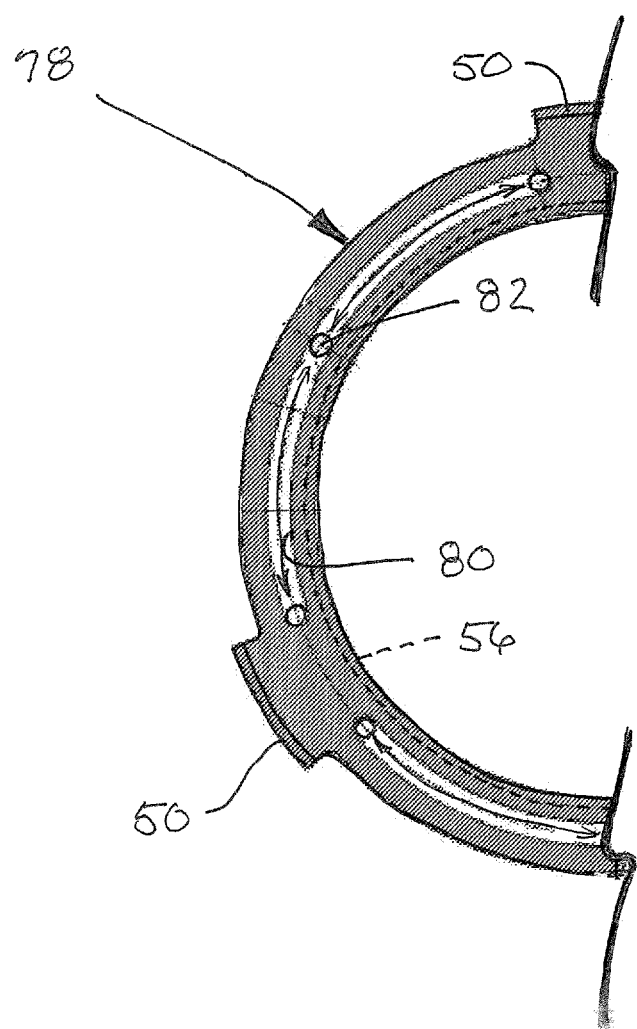
FIG. 3 is a partial axial view of the clutch plate utilized in the launch device seen in FIG. 2.

The clutch plate 78 and hub flange 44 are supported relative to one another for torsional movement. This is achieved in part by a circumferentially extending slot 80 formed in the clutch plate 78, as seen in FIG. 3. A stop pin 82 extends through the slot 80 and fixes a ring plate 84, mounted outboard of the clutch plate 78, with the hub flange. As such, the stop pin 82 operates to guide the clutch plate 78 during torsional rotation.

Unlike conventional launch devices, the clutch plate 78 integrates the clutch drum 56 with the input member 50 in a unitary, one piece design. As seen in FIG. 3, the slots 80 are located away from the radial alignment of the input members 50 with the clutch drum 56. Thus, circumferentially, the slots 80 are formed in the clutch plate 78 at locations between the input members 50, which are radially spaced about the circumference of the clutch plate 78. Locating the slots 80 in circumferential positions away from the alignment between the input member 50 and the clutch drum 56 strengthens the unitary clutch plate 78 and allows for larger springs 48 and longer torsional angles covered by the springs 48. As a result, the clutch assembly 32 and damper 40 permit the launch device 10 to incorporate lower spring rates, increased damper angular travel, lower hysteresis torque, reduced axial packaging and reduced noise and vibration performance. As seen in FIG. 3, the construction defined herein allows the damper to be constructed with less than four input members 50 circumferentially spaced there around and, correspondingly, less than four circumferentially extending springs 48, each spring 48 being located between adjacent ones of the input members 50.

During operation of the launch device 10, fluid from OFF pressure chamber 66 flows radially around the damper 40 into a circumferential chamber 86, which is generally defined between the radial sides of the front and rear covers 12, 16 and the turbine 22. Some of this fluid then also passes from the circumferential chamber 68 into the hydrodynamic space between the impeller 18 and the turbine 22, where the fluid operates to define the fluid coupling within the launch device 10. Hydraulic fluid can also pass from the fluid coupling into pathway 88 and exit the launch device 10 through a passage 90. Some fluid may also pass from the fluid coupling into pathway 92 and exit the launch device 10 through a passage 94

It should be noted that the described fluid flow is for the illustrated launch device 10. The exact fluid flow can and will vary based on the specific design criteria of the launch device and the device 10 may be alternatively configured in a two or four pass device, instead of the illustrated three pass configuration.

As a person skilled in the art will readily appreciate, the above description is meant as an illustration of at least one implementation of a launch device incorporating the principles of the present invention. This description is not intended to limit the scope or application of this invention since the invention is susceptible to modification, variation and change without departing from the spirit of this invention, as defined in the following claims.

I claim:

1. A launch device for coupling a rotary output of a prime mover to a rotary input of a transmission, the launch device comprising:
    a front cover configured to connect to the rotary output member of the prime mover;
    an output hub defining a central axis and configured to connect to the rotary input of the transmission;
    a rear cover connected to the front cover and rotatable therewith, the front cover and the rear cover cooperating to define a chamber;
    an impeller having a plurality of impeller blades extending in the chamber;
    a turbine located within the chamber and including a plurality of turbine blades generally opposing the impeller blades such that hydraulic fluid is directed from the impeller blades and toward the turbine blades;
    a damper coupled between the turbine and the output hub of the launch device;
    a lockup clutch assembly coupled to the damper and configured to releasably lock the main damper for rotation with one of the front and rear covers, the lockup clutch assembly being connected to the damper by a clutch plate integrating a clutch drum of the clutch assembly and input members of the damper, the clutch plate being moveable relative to and supported by a hub flange of the damper, the supporting of the clutch plate including rotatably supported on the hub flange and stop pins extending through circumferential slots defined in the clutch plate that fix an annular ring plate on one side of the clutch plate with the hub flange on the other side of the clutch plate and which guide the clutch plate.

2. The launch device according to claim 1, wherein the clutch plate is unitary and incorporates portions defining the clutch drum at one end and portions defining the input members at another end.

3. The launch device according to claim 1, wherein the clutch plate is continuous between the clutch drum and the input members.

4. The launch device according to claim 1, wherein the clutch plate is radially continuous between the clutch drum and the input members.

5. The launch device according to claim 1, wherein the clutch drum and input members are axial extensions and are connected by a radially extending portion of the clutch plate.

6. The launch device according to claim 5, wherein the circumferentially extending slots are formed in the radially extending portion of the clutch plate.

7. The launch device according to claim 6, wherein each of the slots is wholly located between adjacent ones of the input members.

8. The launch device according to claim 5, wherein the hub flange includes portions defining the output hub.

9. The launch device according to claim 1, wherein the clutch plate includes less than four input members.

10. The launch device according to claim 1, wherein the damper includes less than four circumferentially extending springs.

11. The launch device according to claim 1, further comprising a plurality of friction plates extending radially inward from the clutch drum.

12. The launch device according to claim 1, wherein the clutch drum is located radially inward of the input members.

13. The launch device according to claim 1, wherein the ring plate is located radially outward of the clutch drum.

14. The launch device according to claim 1, wherein the ring plate is located radially inward of the input member of the damper.

15. The launch device according to claim 1, wherein the ring plate is wholly located radially between the clutch drum and the input member of the damper.

16. The launch device according to claim 1, wherein the ring plate is supported on the input of the transmission by the hub flange.

17. The launch device according to claim 1, wherein the clutch drum is located radially inward of the input member of the damper.

18. The launch device according to claim 1, wherein the damper further comprises a plurality of circumferentially extending springs, the springs being supported by a support plate mounted to the hub flange, the support plate being a floating support plate and being circumferentially moveable relative to the hub flange.

19. The launch device according to claim 1, wherein the damper further comprises a plurality of circumferentially extending springs, the springs being supported by a support plate mounted to the hub flange, the support plate wrapping around a majority of the circumference of the springs.

20. The launch device according to claim 1, wherein the damper further comprises a plurality of circumferentially extending springs, the springs being supported by a support plate that is moveably mounted to the hub flange, the support plate being moveably mounted to the hub flange by a retaining plate and the retaining plate being fixed to the hub flange by the stop pins.

\* \* \* \* \*